United States Patent
Moe et al.

(10) Patent No.: US 9,084,265 B2
(45) Date of Patent: Jul. 14, 2015

(54) SPECTRUM SHARING IN MULTI-RAT RADIO BASE STATIONS

(75) Inventors: Johan Moe, Mantorp (SE); Pål Frenger, Linköping (SE); Niclas Wiberg, Linköping (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 119 days.

(21) Appl. No.: 13/878,615

(22) PCT Filed: Oct. 21, 2010

(86) PCT No.: PCT/SE2010/051143
§ 371 (c)(1),
(2), (4) Date: Apr. 10, 2013

(87) PCT Pub. No.: WO2012/053952
PCT Pub. Date: Apr. 26, 2012

(65) Prior Publication Data
US 2013/0210447 A1    Aug. 15, 2013

(51) Int. Cl.
| | |
|---|---|
| H04W 72/00 | (2009.01) |
| H04W 72/04 | (2009.01) |
| H04W 28/16 | (2009.01) |
| H04W 24/00 | (2009.01) |
| H04W 88/10 | (2009.01) |

(52) U.S. Cl.
CPC .......... H04W 72/0486 (2013.01); H04W 28/16 (2013.01); H04W 24/00 (2013.01); H04W 88/10 (2013.01)

(58) Field of Classification Search
CPC ..... H04W 28/08; H04W 16/04; H04W 16/08; H04W 16/14; H04W 24/08
USPC ............... 455/450, 453, 452.1, 452.2, 454
See application file for complete search history.

(56) References Cited

U.S. PATENT DOCUMENTS

| | | | | |
|---|---|---|---|---|
| 8,090,376 | B2 * | 1/2012 | Tolli | 455/439 |
| 8,644,273 | B2 * | 2/2014 | Choi et al. | 370/338 |

FOREIGN PATENT DOCUMENTS

| | | |
|---|---|---|
| EP | 2 094 024 A1 | 8/2009 |
| WO | WO 2004/060002 A1 | 7/2004 |
| WO | WO 2010/077318 A1 | 7/2010 |

OTHER PUBLICATIONS

International Search Report, Application No. PCT/SE2010/051143, Jun. 29, 2011.

(Continued)

Primary Examiner — Temica M Beamer
(74) Attorney, Agent, or Firm — Myers Bigel Sibley & Sajovec, P.A.

(57) ABSTRACT

Embodiments herein disclose a method in a radio base station (12) for allocating a radio resource to be used for communication in a radio communications network, which radio base station (12) serves a first cell (13) of a first radio access technology and a second cell (15) of a second radio access technology. The first cell (13) and second cell (15) are comprised in the radio communications network, and which radio base station (12) controls a radio resource that supports communication over a frequency band The method comprises determining (1010) a load in at least one of the first cell (13) and second cell (15), and allocating (1020) the radio resource supporting communication over the frequency band to the first radio access technology of the first cell (13) or the second radio access technology of the second cell (15) based on the determined load.

16 Claims, 11 Drawing Sheets

(56) References Cited

OTHER PUBLICATIONS

Written Opinion of the International Searching Authority, Application No. PCT/SE2010/051143, Jun. 29, 2011.

International Preliminary Report on Patentability, Application No. PCT/SE2010/051143, Nov. 12, 2012.

Hernández et al., Interference Management through Resource Allocation in Multi-Cell OFDMA Networks, *IEEE 69$^{th}$ Vehicular Technology Conference*, Apr. 26-29, 2009, pp. 1-5.

* cited by examiner

SPECTRUM SHARING IN MULTI-RAT RADIO BASE STATIONS

CROSS REFERENCE TO RELATED APPLICATION

This application is a 35 U.S.C. §371 national stage application of PCT International Application No. PCT/SE2010/051143, filed on 21 Oct. 2010, the disclosure and content of which is incorporated by reference herein in its entirety. The above-referenced PCT International Application was published in the English language as International Publication No. WO 2012/053952 A1 on 26 Apr. 2012.

TECHNICAL FIELD

Embodiments herein relate to a method and a radio base station. In particular, embodiments herein relate to a radio base station serving a first cell of a first radio access technology and a second cell of a second radio access technology.

BACKGROUND

In radio communications system of today the number of radio access technologies are continuously increased and to serve as many user equipment as possible it is important to support different radio access technologies. Modern radio base stations may be equipped with support for several radio access technologies. For an operator of a radio communications system, this kind of multi Radio Access Technology (RAT) radio base station means that the operator only need to buy one radio base station in order to cover an area with different RATs, such as, Long Term Evolution (LTE), LTE-Advanced, 3rd Generation Partnership Project (3GPP) Wideband Code Division Multiple Access (WCDMA) system, High Speed Access Data (HSPA), Global System for Mobile communications/Enhanced Data rate for GSM Evolution (GSM/EDGE), Worldwide Interoperability for Microwave Access (WiMax), Ultra Mobile Broadband (UMB), and/or the like.

A multi RAT radio base station, that is, a radio base station that serves a plurality of cells of different RATs, may be designed in many different ways. For example, radio units, such as antennas, used for each RAT may be separated or common in the radio base station. Multi RAT radio base stations of today are statically configured. This means that the resource split between RATs may not be changed. A multi RAT radio base station may comprise a Radio Resource Manager (RRM) that may be used to move a User Equipment (UE) between different RATS with set frequency ranges, for example, for the purpose of load balancing. However, this is inefficient since UEs may be forced to use a less advanced RAT than what the UEs are capable of, leading to an inefficient use of resources within the radio communications network.

SUMMARY

An object of embodiments herein is to provide a method and radio base station to improve performance of a radio communications network in an efficient manner.

According to a first aspect of embodiments herein the object is achieved by a method in a radio base station for allocating a radio resource to be used for communication in a radio communications network. The radio base station serves a first cell of a first radio access technology and a second cell of a second radio access technology. Thus, the radio base station comprises a multi RAT radio base station. The first cell and second cell are comprised in the radio communications network. The radio base station controls a radio resource that supports communication over a frequency band. The radio base station determines a load in at least one of the first cell and second cell. The radio base station then allocates the radio resource supporting communication over the frequency band to the first radio access technology of the first cell or the second radio access technology of the second cell based on the determined load.

In order to perform the method a radio base station is provided. The radio base station for allocating a radio resource to be used for communication in a radio communications network is configured to serve a first cell of a first radio access technology and a second cell of a second radio access technology. The first cell and second cell are comprised in the radio communications network and the radio base station is arranged to control a radio resource that supports communication over a frequency band. The radio base station comprises a determining circuit configured to determine a load in at least one of the first cell and second cell. The radio base station further comprises an allocating circuit configured to allocate the radio resource supporting the frequency band to the first radio access technology of the first cell or the second radio access technology of the second cell based on the determined load.

The radio base station may allocate the radio resource such that the frequency band is dynamically allocated to the first radio access technology or the second radio access technology, thus, providing more radio resources to a radio access technology with a higher need of radio resources. For example, a user equipment in a heavy loaded cell may be allocated a radio access technology of improved performance as the use of one or parts of a frequency band may be altered to the radio access technology of improved performance instead of being load balanced to a lower performance radio access technology. Thus, the performance of the radio communications network is improved in an efficient manner.

BRIEF DESCRIPTION OF THE DRAWINGS

Embodiments will now be described in more detail in relation to the enclosed drawings, in which.

DETAILED DESCRIPTION

Figure 1:
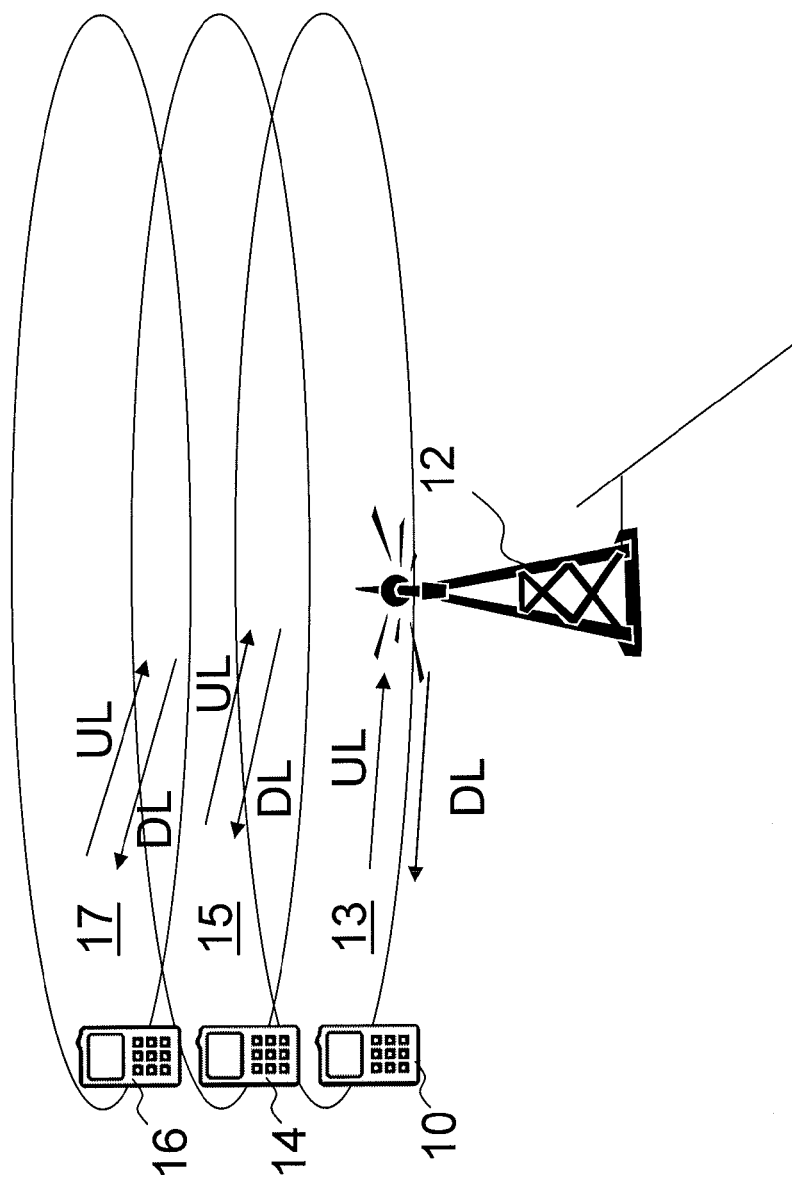
FIG. 1 is a schematic block diagram depicting a radio communications network.

FIG. 1 provides a general overview of a radio communications network and shows a schematic overview of cells of different radio access technologies. In a typical radio communications network, also referred to as a wireless communication network, user equipments, shown as a first User Equipment (UE) 10 also known as mobile terminals and/or wireless terminals communicate via a Radio Access Network (RAN) to one or more core networks, such RAN may be e.g. the Long Term Evolution (LTE), LTE-Advanced, 3rd Generation Partnership Project (3GPP) Wideband Code Division Multiple Access (WCDMA) system, High Speed Access Data (HSPA), Global System for Mobile communications/Enhanced Data rate for GSM Evolution (GSM/EDGE), Worldwide Interoperability for Microwave Access (WiMax), or Ultra Mobile Broadband (UMB), just to mention some few arbitrary possible options where the embodiments herein may be implemented. The first user equipment 10 may be a mobile station, a mobile telephones also known as "cellular" telephones, and laptops with wireless capability, e.g., mobile termination, and thus may be, for example, portable, pocket, hand-held, computer-included, or car-mounted mobile devices which communicate voice and/or data with radio access network.

In FIG. 1, the first user equipment 10, is served by a radio base station 12, and transmits a signal to the radio base station 12 in an uplink (UL) transmission in the radio access network of the radio communications network. The radio access network covers a geographical area which is divided into cell areas, with each cell area being served by the radio base station 12, which in some networks is also called "eNB", "eNodeB", "NodeB" or "B node", which can be of different classes e.g. macro eNodeB or home eNodeB or pico base station. A cell is a geographical area where radio coverage is provided by the radio base station 12. The radio base station 12 communicates over an air interface operating on radio frequencies with the first user equipment 10 within range of the cell.

The radio base station 12 transmits a signal to the first user equipment 10 in a downlink (DL) transmission. The first UE 10 is supporting a first radio access technology illustrated in the example as LTE but may be any of the above mentioned radio access technologies. The radio base station 12 supports multiple radio access technologies. For example, the radio base station 12 serves a first cell 13 of the first radio access technology. A second user equipment 14 is supporting a second radio access technology illustrated in the example as HSPA but may be any of the above mentioned radio access technologies. The radio base station 12 further serves a second cell 15 of the second radio access technology. The second user equipment 14 is served in the second cell 15. A third user equipment 16 is supporting a third radio access technology illustrated in the example as GSM/EDGE but may be any of the above mentioned radio access technologies. The radio base station 12 serves a third cell 17 of the third radio access technology. Thus, the third user equipment 16 is served in the third cell 17.

Embodiments herein disclose a method wherein one or more radio resources, for example, radio frequencies, of a frequency band, supported by the radio base station 12, are allocated to the different cells 13,15,17 based on load in the different cells 13,15,17. Thus, if there is a heavy load in the second cell 15 parts or all of a shared frequency band is allocated to the second cell 15. This allocation of the radio resource within the radio base station 12 leads to a more efficient use of resources within the radio communications network improving the performance of the active UE 10,14, 16 in the radio communications network. A shared frequency band here means that the frequency band may be allocated to any of the supported radio access technologies. The radio resource may further comprise one or more antenna units, radio frequencies, base band units, or other radio resources supporting communication over the frequency band. Hence, embodiments herein provide the use of at least one frequency band that is alternating between at least two radio access technologies. Heavy load may be defined as a load that exceeds a load threshold value of load, which load threshold value may be preset or dynamically, set according to statistics or in relation to maximum possible or available radio resources.

In case of Frequency Division Duplex (FDD), wherein two-way radio communication is performed by using two distinct radio channels, embodiments herein are valid for both the uplink and the downlink bands independently. Additionally, embodiments herein are also valid for Time Division Duplex (TDD), wherein two way radio communication is performed using a single frequency to transmit signals in both UL and DL, where compatible UL/DL allocations on adjacent bands may be assured.

Figure 2:
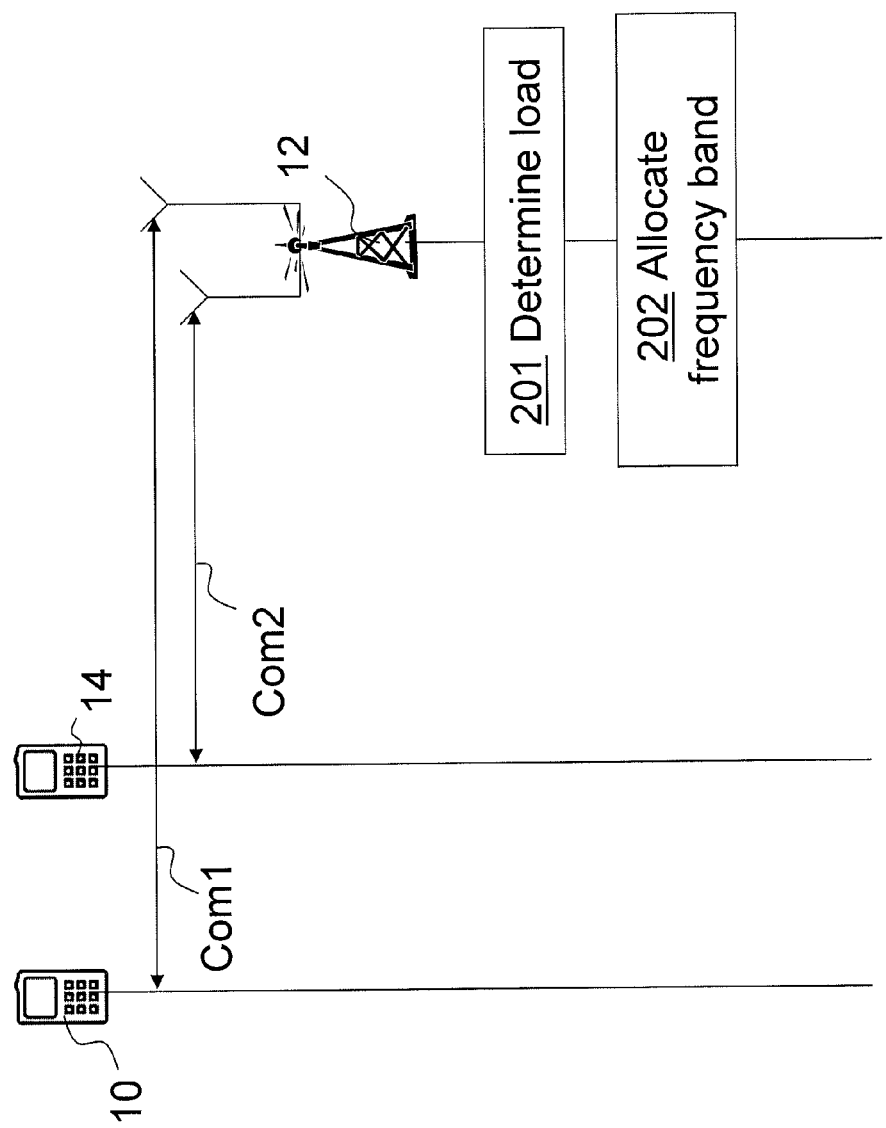
FIG. 2 is a combined signalling and flowchart in a radio communications network.

FIG. 2 is a schematic overview of a combined flowchart and signalling scheme in a radio communications network. The radio base station 12 supports the first radio access technology and the second radio access technology. In the illustrated example, the radio base station 12 comprises a radio unit such as an antenna per each radio access technology. However, in some embodiments the radio base station 12 may comprise a common radio unit for both the radio access technologies.

The first user equipment 10 is communicating with the radio base station 12 using for example a frequency band dedicated to the first radio access technology. The second user equipment 14 is communicating with the radio base station 12 using for example a frequency band dedicated to the second radio access technology. This is indicated in the figure by the arrows Com1 and Com2 from the first and second user equipment 10, 14 to the radio base station 12.

The radio base station 12 supports a frequency band that may be allocated to the first radio access technology of the first cell 13 or the second radio access technology of the second cell 15 or any other radio access technology supported by the radio base station 12.

Step 201. The radio base station 12 determines a load in the first cell 13 and/or the second cell 15. The load may here be defined as number of user equipments in an idle mode and/or an active mode, number of handovers, amount of data transmitted within a cell, indication of packet delay, length of buffer queue, level of transmission power, ratio of physical resource utilization and/or the like. The load may also be defined as the amount of user equipment support a certain radio access technology. For example, the radio resources may be allocated to a radio access technology based on the number of user equipment supporting that radio access technology.

Step 202. The radio base station 12 allocates the radio resource to the first radio access technology of the first cell 13 or the second radio access technology of the second cell 15 based on the determined load. The radio resource supports communication over the frequency band and may be defined as a radio frequency, a radio frequency band. The radio resource may also be defined as a radio equipment within the radio base station such as a base band unit supporting communication over a certain radio frequency or frequency band, a radio unit comprising an antenna or other radio equipment supporting communication over the frequency band. Thus, the radio base station 12 may allocate a radio frequency of the frequency band supporting communication over the frequency band. The allocation of the radio resource may further be to widen or reduce the range of the base band unit or to allocate the use of a radio unit comprising an antenna.

In some embodiments, the load may change in the different cells 13, 15 and the radio base station 12 then adjusts the allocation of the radio resource corresponding to the changed load in the cells. Thus, a dynamical allocation of one or more radio resources supporting communication over the frequency band is achieved.

In some embodiments when the load in the first cell 13 and the load in the second cell 15 are determined to be below a load threshold value the frequency band may be allocated to both the first cell 13 and the second cell 15. The load threshold value may define the load to be low when being below said load threshold value.

Figure 3:
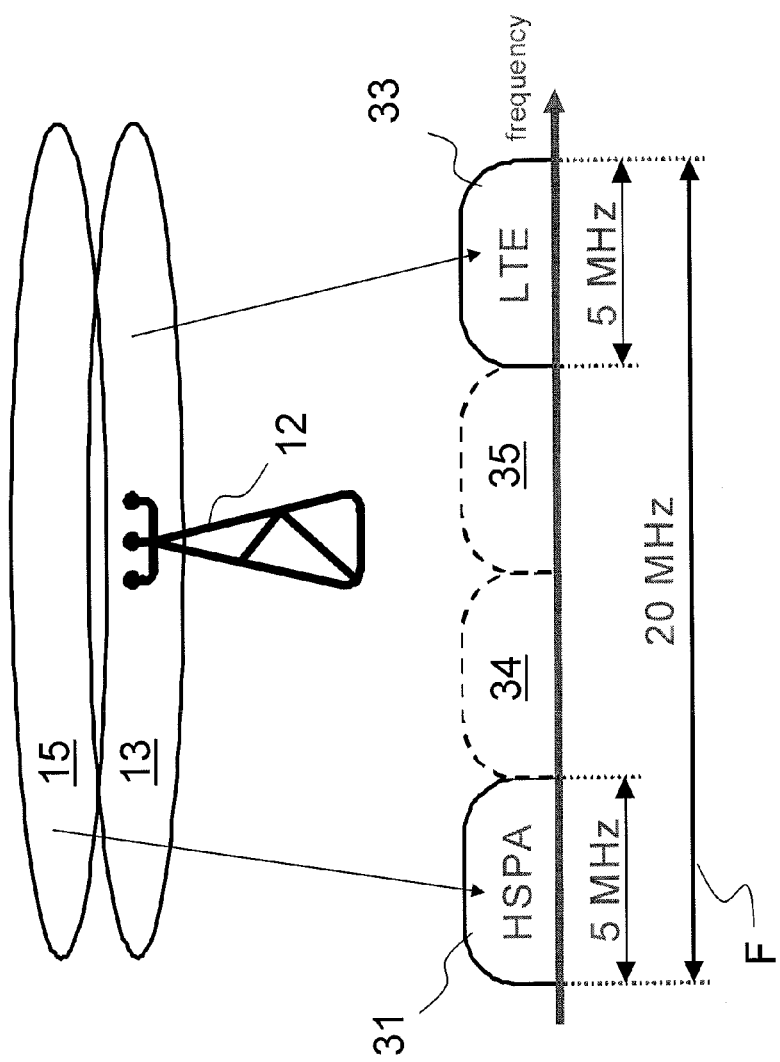
FIG. 3 is a schematic overview of a radio base station.

FIG. 3 shows a schematic overview of a downlink (DL) frequency range F of e.g. 20 MHz. The FIG. 3 shows the DL frequency range F where common channels and signals are transmitted, e.g. Physical Broadcast Channel (PBCH), secondary synchronization signal (SSS), a primary synchronization signal (PSS), cell-specific reference signals (CRS) in case of LTE, and Primary Common Pilot Channel (P-CPICH), Primary Common Control Physical Channel (P-CCPCH) in case of WCDMA/HSPA. The DL frequency range F comprises a first dedicated frequency band 31, dedicated for example to the radio access technology HSPA. Furthermore, the DL frequency range F comprises a second dedicated frequency band 33, dedicated for example to the radio access technology LTE. The DL frequency range F also comprises a first intermediate frequency band 34 and a second intermediate frequency band 35. A carrier of a frequency within the first or second intermediate frequency range may be by default set not to support any radio access technology. The first and/or second intermediate frequency band 34, 35 may, based on the loads in the cells 13,15 of the radio base station 12, be allocated to the first radio access technology of the first cell 13 and/or the second radio access technology of the second cell 15.

It should here be noted that the intermediate frequency bands 34, 35, also referred to as extension frequency bands, between the first dedicated frequency band and the second dedicated frequency band is divided into two frequency bands in the FIG. 3 since the HSPA is fixed to multiples of 5 MHz. Thus, the frequency band to be dynamically allocated to a radio access technology may comprise one or more frequency bands.

The radio resource supporting communication over the first intermediate frequency band 34 and the second intermediate frequency band 35 may, when heavy load of for example HSPA is present in the second cell 15, be allocated to the radio access technology of the second cell 15 of the first dedicated frequency band 31.

In some embodiments, the radio resource supporting communication over the first intermediate frequency band 34 and the second intermediate frequency band 35 may, when heavy load of for example LTE is present in the first cell 13, be allocated to the radio access technology of the first cell 13 of the second dedicated frequency band 33. In some embodiments, when traffic is evenly distributed in the first and second cells 13, 15, the radio resource supporting the first intermediate frequency band 34 and the second intermediate frequency band 35 may be evenly allocated to the radio access technology of the second cell 15 of the first dedicated frequency band 31 and to the radio access 35 technology of the first cell 13 of the second dedicated frequency band 33. Heavy load may be defined as a load that exceeds a load threshold value of load, which load threshold value may be preset or dynamically set through e.g. Radio Resource Control signalling or other control signalling within the radio communications network.

Figure 4:
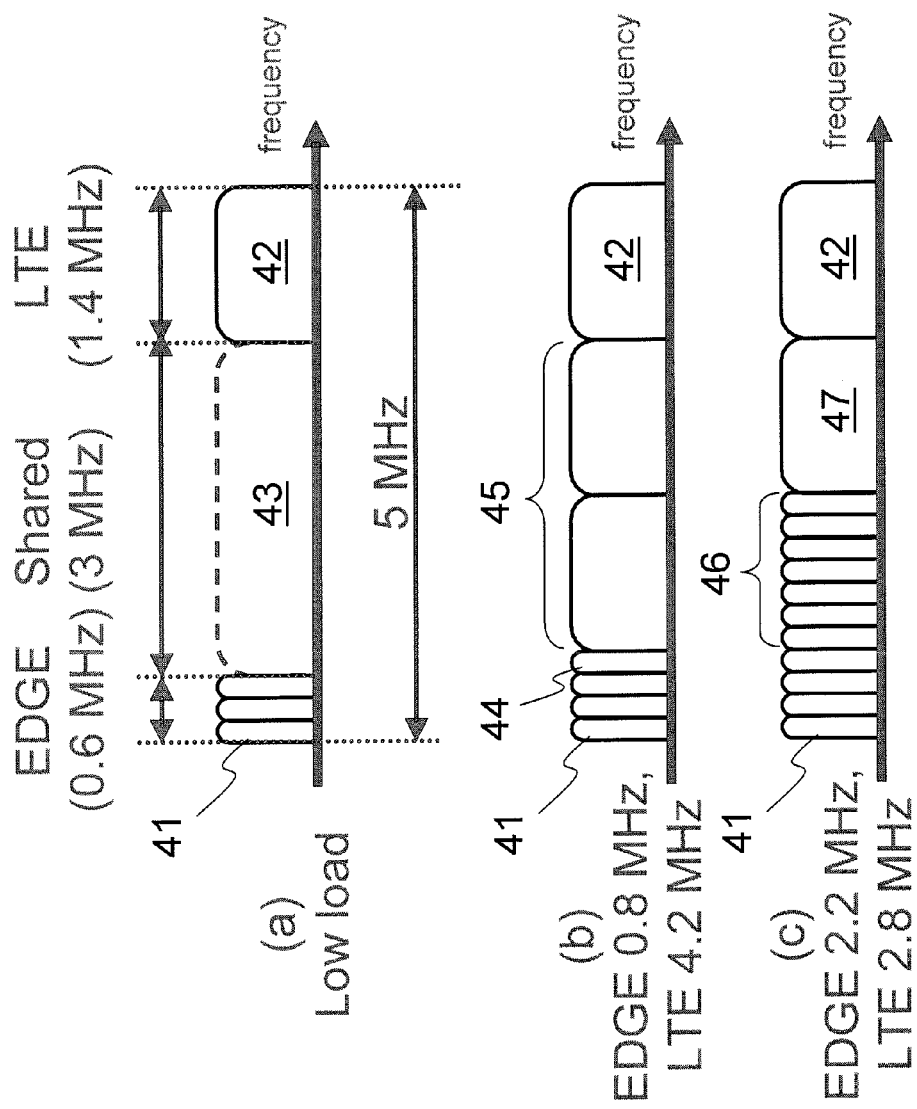
FIGS. 4a-4c are schematic diagrams of frequency bands used in a radio communications network.

In FIGS. 4a-4c schematic diagrams depicting distribution of frequency band to different radio access technologies are shown. FIGS. 4a-4c disclose examples of dynamic multi-RAT configurations of EDGE and LTE in a 5 MHz frequency band. FIGS. 4a-4c show examples of frequency band allocations wherein the first radio access technology comprises EDGE and the second radio access technology comprises LTE. EDGE is fixed to multiples of 200 kHz and system bandwidth of LTE may be any of 1.4, 1.6, 3, 3.2, 5, 10, 15, or 20 MHz.

FIG. 4a shows a frequency allocation in a system with low load, that is, load under a load threshold value within the cells of the radio communications network. The load threshold value may be preset at the radio base station 12 or dynamically set through e.g. Radio Resource Control signalling or other control signalling within the radio communications network. Some cells may only use dedicated frequency bands of the different radio access technologies. For example, a first frequency band 41 dedicated to EDGE comprises three 200 kHz bands, i.e. 0.6 MHz, and a second frequency band 42 dedicated to LTE of 1.4 MHz. A shared frequency band 43 between the dedicated frequency bands 41,42 may be used for sending System Information or the like to the different cells. The shared frequency band 43 comprises 3 MHz.

FIG. 4b shows an example wherein the load in the cell supporting EDGE has increased and need more radio resources supporting EDGE communication within the EDGE cell. An extra EDGE frequency band of 200 kHz is denoted as 44. The load in the cell of LTE has increased more than the load in the EDGE cell and an extra frequency band 45 of 2.8 MHz has been allocated to LTE. Thus, the first frequency band of EDGE comprises 0.8 MHz and the second frequency band of LTE comprises 4.2 MHz, or 3×1.4 MHz.

FIG. 4c shows an example wherein the load in the cell supporting EDGE has almost been evened out with the load in the cell supporting LTE. A number of fixed frequency bands 46 of EDGE have been allocated to the cell of EDGE. Still, the cell of LTE has been allocated a new LTE frequency band 47 of 1.4 MHz in addition to the dedicated frequency band 42 of 1.4 MHz. Thus, the first frequency band of EDGE comprises 2.2 MHz and the second frequency band of LTE comprises 2.8 MHz.

It should be understood that even though the frequency spectrum of the different radio access technologies in the example is contiguous, this is not a requirement. Thus, the frequency bands of different radio access technologies may be alternating along the frequency range. In the illustrated examples one or more radio resources supporting communication over the frequency band is exemplified as radio frequencies but may comprise other resources such as equipment within the radio base station 12 supporting communication over the frequency band, e.g. an antenna or a base band unit.

Figure 5:
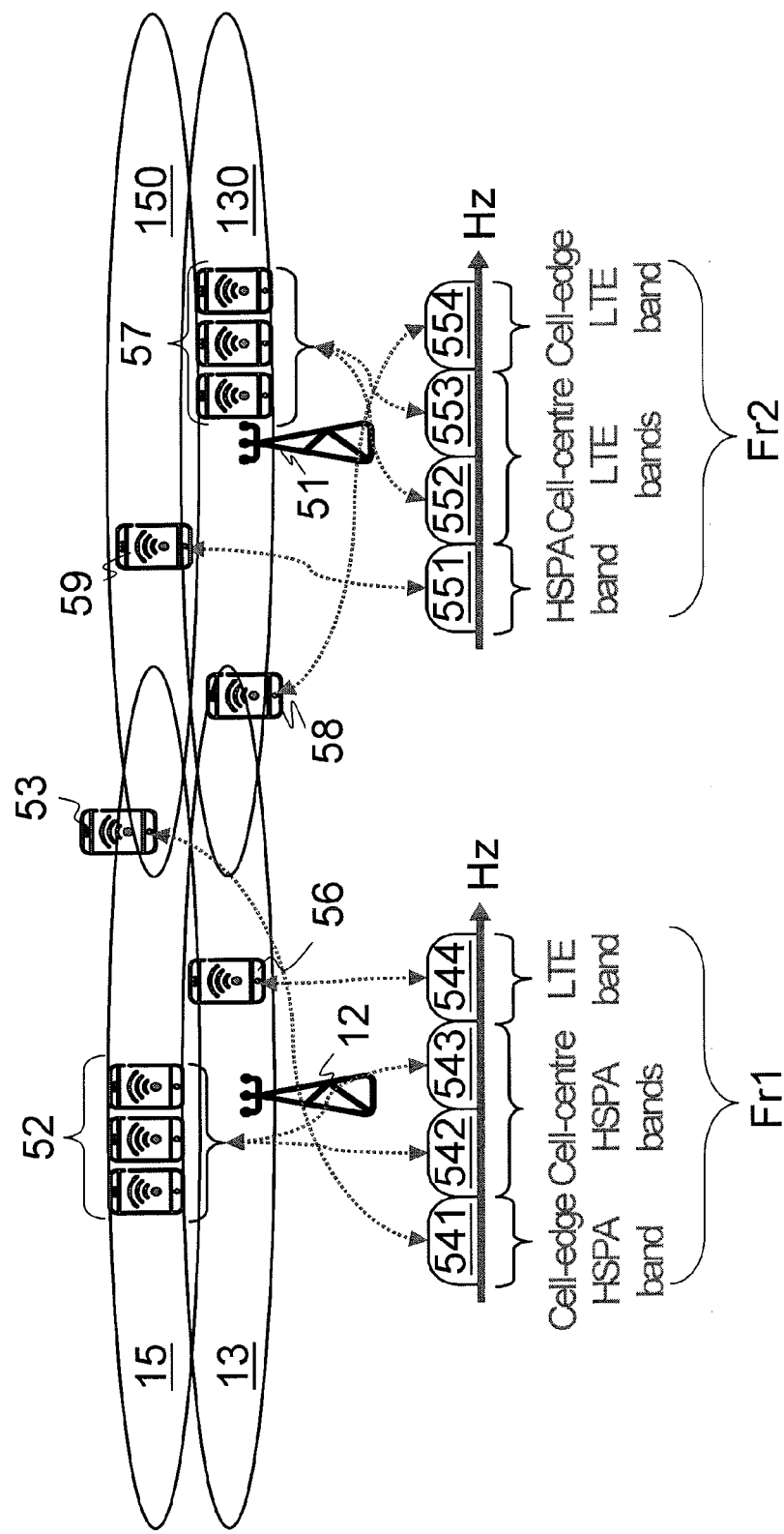
FIG. 5 is a schematic overview of a radio communications network.

FIG. 5 shows a schematic overview depicting a radio communications system with a reduced Inter-cell Interference. The radio communications system comprises the radio base station 12, denoted as the first radio base station 12 in FIG. 5, and also a second radio base station 51. The first radio base station 12 serves the first cell 13 of the first radio access technology and the second cell 15 of the second radio access technology. A number of first user equipments 52 are served in the second cell 15 and are positioned near a cell centre of the second cell 15. A second user equipment 53, also served in the second cell 15, is positioned near an edge of the second cell 15. A third user equipment 56 is served by the first cell 13 and positioned somewhere in the first cell 13. The first radio base station 12 supports a first frequency range Fr1. The first frequency range Fr1 comprises a first frequency band 541 dedicated to the second radio access technology of the second cell 15. Furthermore, the first frequency range Fr1 comprises a second frequency band 542 and a third frequency band 543. The second frequency band 542 and the third frequency band 543 may be allocated to any cell based on load in the cells. In the illustrated example, the second frequency band 542 and third frequency band 543 are allocated to the second radio access technology in the second cell 15. In addition, the first frequency range Fr1 comprises a fourth frequency band 544 dedicated to the first radio access technology of the first cell 13.

The second radio base station 51 serves a third cell 130 of the first radio access technology and a fourth cell 150 of the second radio access technology. A number of fourth user equipments 57 are served in the third cell 130 and are positioned near a cell centre of the third cell 130. A fifth user equipment 58, also served in the third cell 130, is positioned near an edge of the third cell 130. A sixth user equipment 59 is served by the fourth cell 150 and positioned somewhere in the fourth cell 150. The second radio base station 51 supports a second frequency range Fr2 corresponding to the first frequency range Fr1 supported by the first radio base station 12. That is, the second frequency band Fr2 comprises the same frequencies as the first frequency band Fr1. The second frequency range Fr2 comprises a fifth frequency band 551 dedicated to the second radio access technology of the fourth cell 150. The fifth frequency band 551 corresponds to the frequency range of the first frequency band 541. Furthermore, the second frequency range Fr2 comprises a sixth frequency band 552 and a seventh frequency band 553. The sixth frequency band 552 and the seventh frequency band 553 may be allocated to any cell based on loads in the cells. In the illustrated example, the sixth frequency band 552 and the seventh frequency band 553 are allocated to the first radio access technology in the third cell 130. The sixth frequency band 552 and the seventh frequency band 553 correspond to the frequency ranges of the second frequency band 542 and the third frequency band 543. In addition, the second frequency range Fr2 comprises an eighth frequency band 554 dedicated to the second radio access technology of the third cell 130. The eighth frequency band 554 corresponds to the frequency range of the fourth frequency band 544.

In the illustrated example, the first radio access technology is exemplified as LTE and the second radio access technology is exemplified as HSPA but may any of above mentioned radio access technologies.

In order to reduce the interference of different radio access technologies in respective cell 13,15,130,150 the second user equipment 53 is allocated to the first frequency band 541, also denoted as cell edge HSPA band. The number of first user equipments 52 is allocated to the second frequency band 542 and to the third frequency band 543, also denoted as cell centre HSPA bands. The third user equipment 56 is allocated to the fourth frequency band 544, also denoted as LTE band.

Furthermore, the fifth user equipment 58 is allocated to the eighth frequency band 554 as the fifth user equipment 58 is positioned near the edge of the third cell 130. The eighth frequency band 554 is also denoted as cell edge LTE band in the FIG. 5. The number of fourth user equipments 57 is allocated to the sixth frequency band 552 and to the seventh frequency band 553, also denoted as Cell Centre LTE bands. The sixth user equipment 59 is allocated to the fifth frequency band 551, also denoted as HSPA band.

The radio access technology configuration in the different radio base stations 12, 51 is adapted to the loads in the cells 13, 15, 130 and 150. That is, the first radio base station 12 determines that the load in the second cell 15 is heavy and allocates the radio resource or resources supporting communication over the intermediate frequency bands 542, 543 to the second radio access technology. Also, the second radio base station 51 determines that the load in the third cell 130 is heavy and allocates the radio resource or resources supporting communication over the intermediate frequency bands 552, 553 to the first radio access technology.

In, for example, LTE there is support for Inter Cell Interference Coordination (ICIC) by means of signalling between neighboring radio base stations via, for example, an X2 interface established between the radio base stations. ICIC is arranged to keep the inter-cell interferences under control by radio resource management (RRM) methods. ICIC is inherently a multi-cell RRM function that needs to take into account information from multiple cells. Furthermore, HSPA supports ICIC control in the uplink by means of so called non-serving relative grants. For these ICIC techniques to work, it is a requirement that the interfering signal belongs to the same radio access technology. Therefore, in order to minimize the interference from other radio access technologies it is a good idea to put the cell edge user equipments on radio access technology-dedicated frequency bands. In the illustrated example, it is the user equipments 53, 58 near the cell edges that are considered to be the user equipments that interfere the most and that are why these user equipments are allocated to use carriers of the dedicated frequency bands 541, 554. As seen in the FIG. 5, the second user equipment 53 is allocated to the first frequency band 541 and the fifth user equipment 58 is allocated to the eighth frequency band 554. Thus, the second user equipment 53 is using a frequency separated from the frequency used by the fifth user equipment 58 and hence Inter-Cell Interference is avoided or reduced.

However, in some embodiments herein a serving radio base station such as the first or the second radio base station 12, 51 of a user equipment may determine whether the user equipment is causing interference above an interference threshold value towards a neighboring radio base station. The interference may be determined from X2 reports, radio measurements or the like.

In the illustrated example the terms "cell centre UE" and "cell edge UE" may be used to classify the user equipments 52,53,56-59 and there is a correlation with that kind of classification and the physical position of the user equipment, but it is not exactly the same thing. A user equipment may be positioned close to the serving base station 12,51 but have a line-of-sight to a neighboring radio base station 51,12 and therefore it could be classified as a "cell edge UE".

Figure 6:
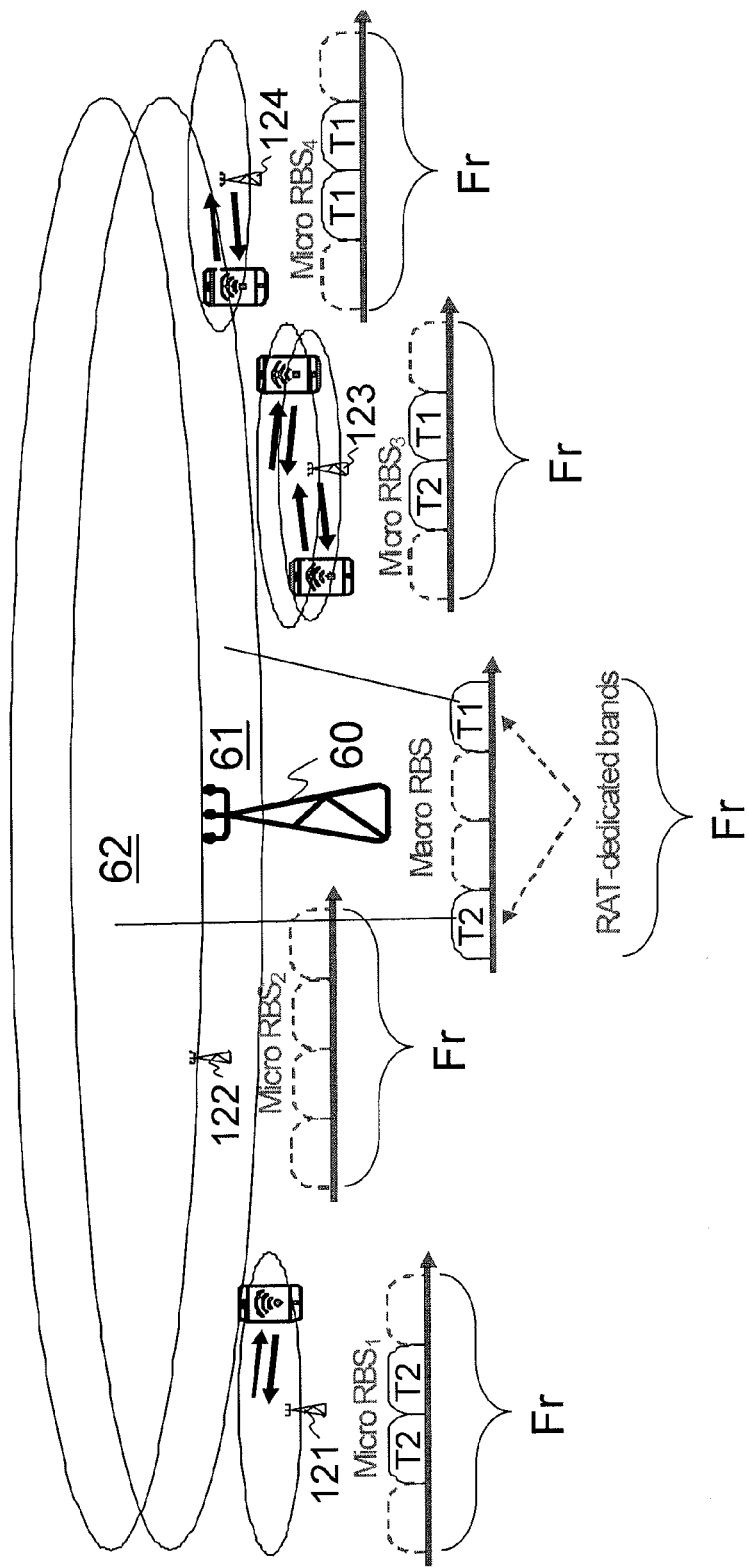
FIG. 6 is a schematic overview of a radio communications network.

FIG. 6 shows a schematic overview depicting some embodiments of a radio communications network. The radio communications network comprises a macro radio base station 60 serving a first macro cell 61 of a first radio access technology, T1, and a second macro cell 62 of a second radio access technology, T2. The first and second radio access technology may comprise any of the techniques, Long Term Evolution (LTE), LTE-Advanced, 3rd Generation Partnership Project (3GPP) Wideband Code Division Multiple Access (WCDMA) system, High Speed Access Data (HSPA), Global System for Mobile communications/Enhanced Data rate for GSM Evolution (GSM/EDGE), Worldwide Interoperability for Microwave Access (WiMax), or Ultra Mobile Broadband (UMB), just to mention some few arbitrary possible options.

The radio communications network further comprises a first micro radio base station 121 serving a first micro cell of the second radio access technology T2. Also, the radio communications network comprises a second micro radio base station 122 with no indicated load and a third micro radio base station 123. The third micro radio base station 123 serves a second micro cell of the first radio access technology T1 and a third micro cell of the second radio access technology T2. In addition, the radio communications network comprises a fourth micro radio base station 124 serving a fourth micro cell of the first radio access technology T1.

In micro cells that are covered by a macro cell all carriers, or other radio resources, may change radio access technologies. The radio access technology configuration in the different micro base stations 121-124 is adapted to the loads in the micro cells. That is, the micro base stations 121-124 determine load in their respective cell or cells and based on the determined load allocate the radio resource supporting communication over the intermediate frequency bands to the first radio access technology T1 or the second radio access technology T2.

The macro base station 60 is operating over a frequency range Fr which is the same as the frequency range of the micro base stations 121-124. In order to avoid problems with uplink and downlink imbalance, embodiments herein avoid using the same frequency bands in the macro and micro layers. Since the macro radio base station 60 provides radio coverage in the area for both radio technologies, T1 and T2, the configuration in the macro radio base station 60 is in this example such that one frequency band is always dedicated for each radio access technology, T1 and T2, in the macro radio base station 60. Intermediate frequency bands between the dedicated frequency bands are used by the micro radio base stations 121-124 thereby avoiding the dedicated radio frequencies of the macro cells 61, 62. Thus, the first micro radio base station 121 uses both the intermediate frequency bands for the second radio access technology T2 based on the load in the first micro cell. The third micro radio base station 123 uses the intermediate frequency bands for the first radio access technology T1 and the second radio access technology T2 based on the load in the second and third micro cell. Finally, the fourth micro radio base station 124 uses both the intermediate frequency bands for the first radio access technology T1 based on the load in the fourth micro cell.

Thereby, problems with uplink and downlink imbalance are avoided since the same frequency bands in the macro and micro layers are not used.

Figure 7:
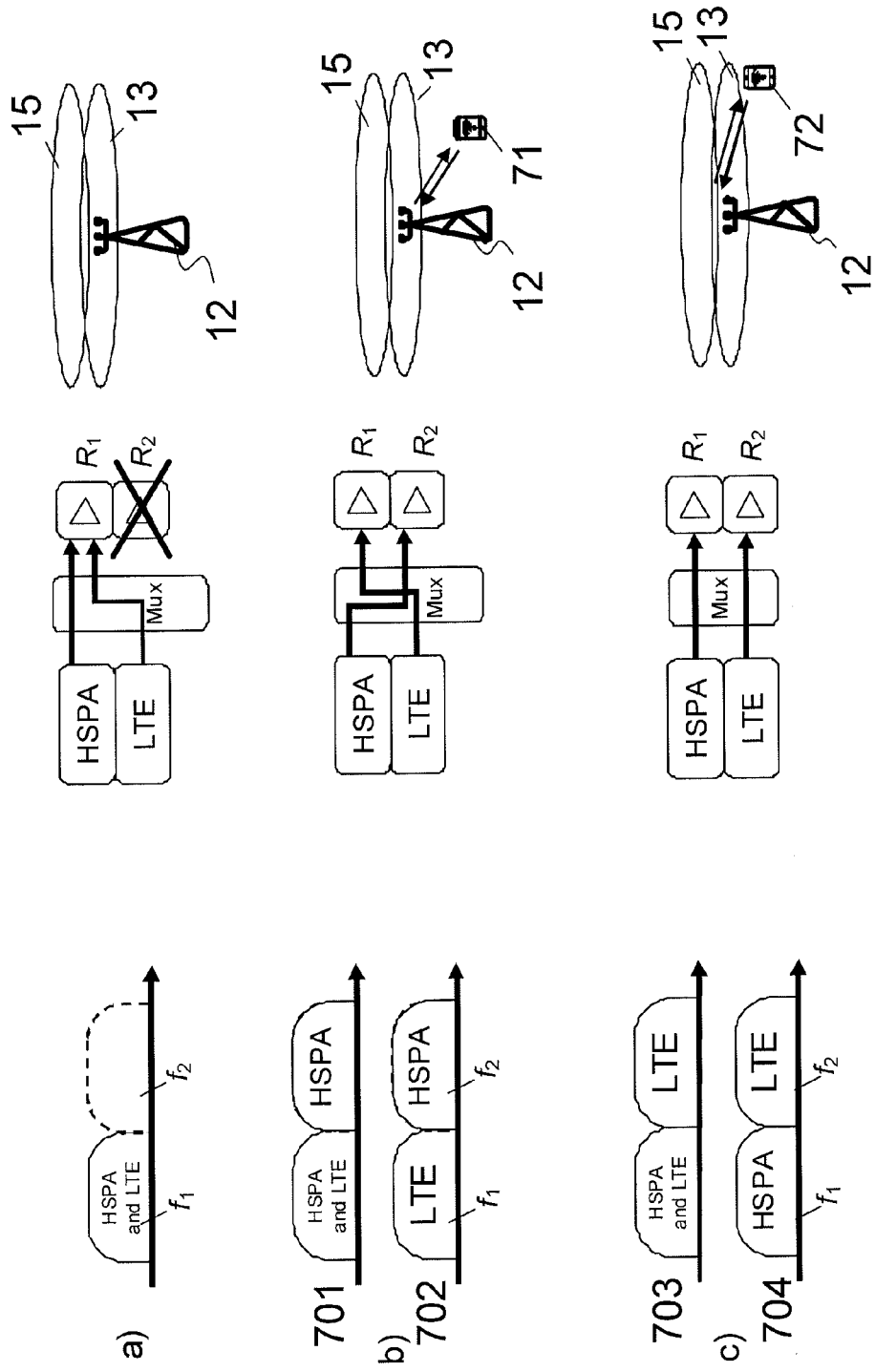
FIGS. 7a-7c are schematic overviews of some embodiments in a radio communications network.

FIGS. 7a-7c show schematic overviews of examples of solutions according to some embodiments herein. FIGS. 7a-7c illustrate the radio base station 12 serving the first cell 13 and the second cell 15. The radio base station 12 supports a first radio access technology, exemplified as LTE, and a second radio access technology, exemplified as HSPA.

FIG. 7a shows a frequency range used when load is low in the cells 13, 15, as stated above the load is determined to be low when the load is below a load threshold value.

The radio base station 12 determines that the load is low in each cell 13,15. When there is no or low load in each cell 13,15 it is possible to support two radio access technologies on the same frequency band as shown in a shared frequency band $f_1$. That is, the radio base station 12 allocates a radio resource, e.g. radio frequency range $f_1$ to be used by both LTE and HSPA. A second frequency band $f_2$ may then not be used. The interference from e.g. HSPA to LTE, or from LTE to HSPA, will be problematic as soon as any significant amount of traffic is supported, but as long as the cells 13, 15 are of low load, supporting two different radio access technologies will work, at least for moderate cell sizes. In case the radio base station 12 has one radio unit dedicated to each frequency band, a first radio unit R1 and a second radio unit R2, the function to turn off one radio unit and save energy when the traffic is low is allowed. That is, the second radio unit R2 may be put in a Discontinuous transmission (DTX) state saving energy within the radio base station 12 when the load is determined to be low in the cells 13, 15. Even though only one power amplifier is used, idle mode user equipments of both radio access technologies are still provided with system information that they need in order to e.g. perform a random access in case they have any data to transmit. Thus, if the loads in the both cells 13, 15 are determined to be below the load threshold value, one radio unit R2 may be shut down in the radio base station 12. The load threshold value may comprise, for example, a preset number of active users, a time value of packet delay, a certain queue length, a certain transmission power, a ratio of physical resource utilization, number of handovers are below five per ten minutes, no random access request in five minutes or similar. The system information is transmitted within the cells 13, 15 from the different radio access technologies through a multiplexer (Mux) via the first radio unit R1.

FIG. 7b shows a frequency range used when a load is detected in the first cell 13. Step 701. As a seventh user equipment (UE) 71 becomes active in the first cell 13 the other non-active radio access technology is moved to the second cell 15. Thus, when the seventh user equipment 71 supporting the first radio access technology becomes active in the first cell 13, the radio base station 12 determines a load in the first cell 13. The radio resource, for example, the second radio unit R2 is turned on, allocated, to support communication of the second radio access technology in the second cell 15 over the second radio frequency band $f_2$ based on the determined load. In the illustrated example the seventh user equipment 71 enters the first cell 13 supporting LTE, the radio base station 12 then allocates the radio resource/s supporting communication of HSPA to the second cell 15.

Step 702. When the radio resource/s supporting communication over the second frequency band f2 has been allocated to the second cell 15, the radio base station 12 allocates the radio resource/s supporting communication over the first frequency band $f_1$ to the first cell 13 supporting the first radio access technology so that the seventh user equipment 71 does not have to perform a handover to the second frequency band $f_2$.

FIG. 7c shows a frequency range used when a load is detected in the second cell 15.

Step 703. As soon as a eighth User Equipment (UE) 72 supporting the second radio access technology becomes active in the second cell 15 the radio base station 12 detects and determines the load in the second cell 15. The radio base station 12 then allocates a radio resource to the first radio access technology based on the determined load. For example, the second radio unit R2 is turned on to support communication of the first radio access technology in the first cell 13 over the second radio frequency band $f_2$. In the illustrated example the eighth user equipment 72 enters the second cell 15 supporting the second radio access technology HSPA, the radio base station 12 allocates the radio resource/s supporting communication of the first radio access technology to the first cell 13 using the second frequency band $f_2$.

Step 704. When the radio resource/s supporting communication over the second frequency band f2 has been allocated to the first cell 13, the radio base station 12, based on the load, allocates the radio resource/s supporting communication over the first frequency band $f_1$ to the second cell 15 supporting the second radio access technology so that the eighth user equipment 72 does not have to perform a handover to the second frequency band $f_2$.

It should however be noted that embodiments herein may be adjusted so that the first radio access technology is always used over f1 and the second radio access technology is always used over f2 whenever there is any traffic. For example, if the two empty cells 13, 15 are transmitted on first frequency band f1 and the eighth user equipment 72 supporting HSPA enters the second cell 15; the second cell supporting HSPA on f2 may start. In that case the eighth user equipment 72 must perform an inter-frequency handover to the HSPA cell on f2 before the HSPA cell 15 on f1 is turned off. The benefit with that is that, whenever there is any traffic in a cell, the interference always comes from the same radio access technology.

This results in that the radio resource supporting communication of the frequency band is dynamically allocated to the first radio access technology of the first cell 13 or the second radio access technology of the second cell 15.

Figure 8:
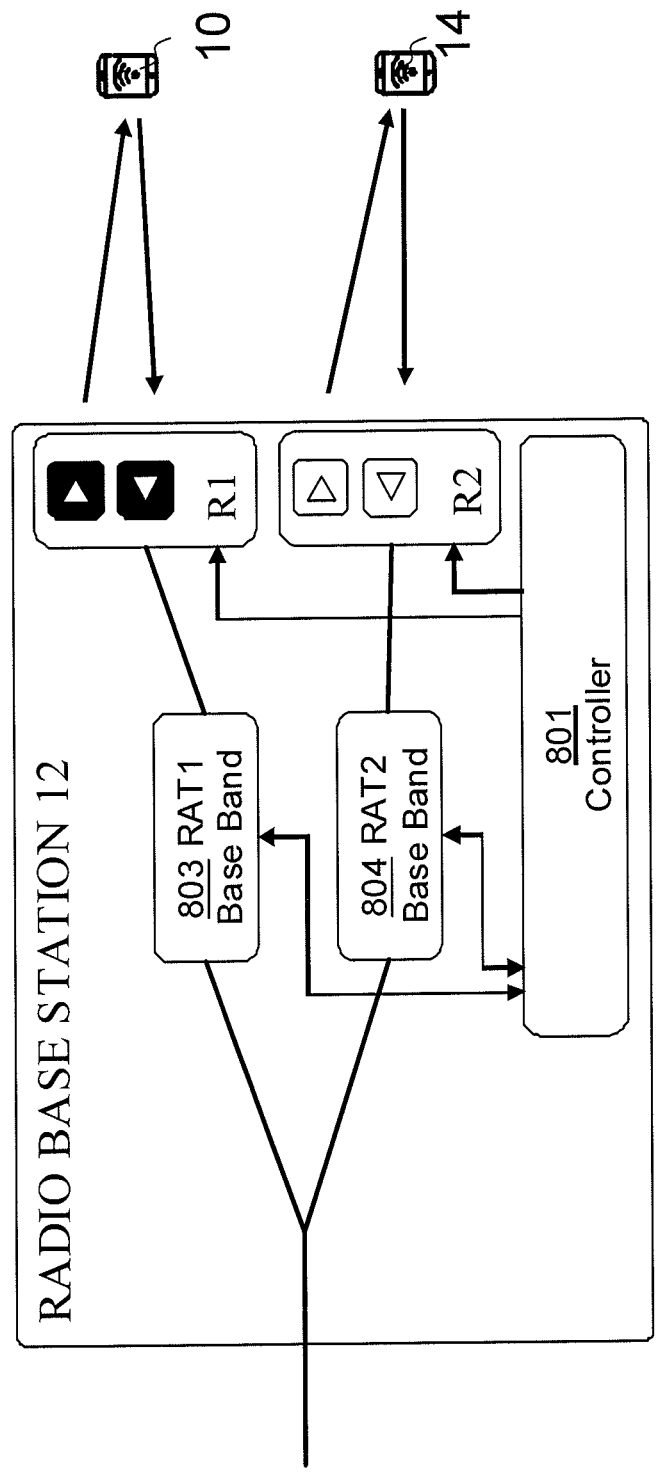
FIG. 8 is a block diagram depicting a radio base station.

FIG. 8 is a schematic overview depicting a radio base station 12 with radio units separated for each radio access technology. The radio base station 12 comprises a controller unit 801 arranged to control a first RAT 1 Base Band unit 803. The first RAT 1 Base Band unit 803 supports communication over a frequency band of the first radio access technology. The controller 801 is also arranged to control a second RAT 2 Base Band unit 804. The second RAT 2 Base Band unit 804 supports communication over a frequency band of the second radio access technology. The controller unit 801 is further arranged to control a first radio unit R1 and a second radio unit R2. The first radio unit R1 may be arranged to support communication over the frequency band of the first radio access technology and the second radio unit R2 may be arranged to support communication over the frequency band of the second radio access technology.

According to embodiments herein the radio base station 12 determines load in the first cell 13 and second cell 15, for example, based on communication from a first user equipment 10 and second user equipment 14. The radio base station 12 supports a frequency band that may be allocated to be used for the first radio access technology or the second radio access technology. The controller unit 801 then allocates one or more radio resources such as radio frequencies supporting communication over the frequency band to the first radio access technology of the first cell 13 or the second radio access technology of the second cell 15 based on the determined load. The controller 801 may increase the frequency band of the first RAT 1 Base Band unit 803 if the load in the first cell 13 is above a load threshold value defined as heavy load. Similarly, the controller unit 801 may reduce the frequency band of the second RAT 2 Base Band unit 804 if the load in the second cell 15 is below another load threshold value defined as low load. In some embodiments, the controller unit 801 may also control the radio units R1,R2 so the radio units R1,R2 are allocated to the first radio access technology of the first cell 13 or the second radio access technology of the second cell 15 based on the determined load.

When determining, for example, that the frequency band, that may be allocated to any radio access technology or parts of it, should be allocated to a different radio access technology, user equipments that are active using these radio frequencies should be reconfigured to either other frequencies or the different radio access technology.

Figure 9:
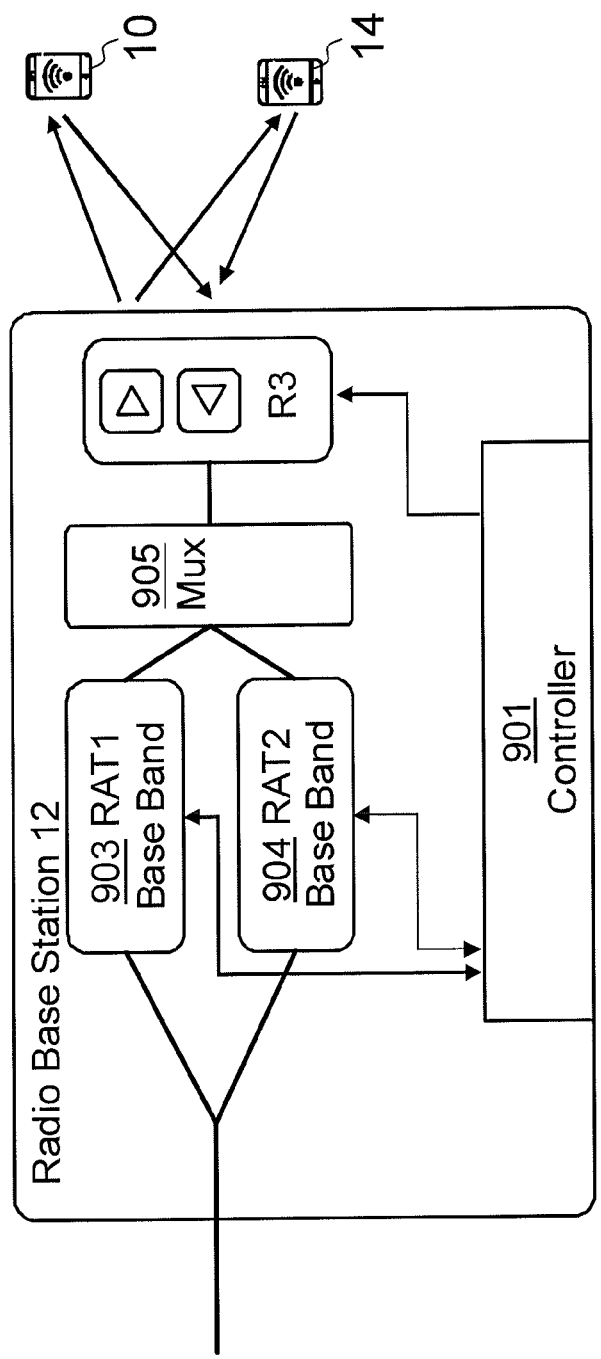
FIG. 9 is a block diagram depicting a radio base station.

FIG. 9 is a schematic overview depicting embodiments of the radio base station 12 comprising a common radio unit R3. The radio base station 12 comprises a controller unit 901 arranged to control a third RAT 1 Base Band unit 903. The third RAT 1 Base Band unit 903 supports communication over a frequency band of the first radio access technology. The controller 901 is also arranged to control a fourth RAT 2 Base Band unit 904. The fourth RAT 2 Base Band unit 904 supports communication over a frequency band of the second radio access technology. The controller unit 901 is further arranged to control the common radio unit R3 that may be arranged to support communication over the frequency bands of the first radio access technology and of the second radio access technology. The transmission signals are multiplexed in a multiplexer 905 before transmitted over the common radio unit R3.

According to embodiments herein the radio base station 12 determines load in the first 13 and second cell 15, for example, based on communication from the first user equipment 10 and the second user equipment 14. As stated above, the radio base station 12 supports a frequency band that may be allocated to be used for the first radio access technology and/or the second radio access technology. The controller unit 901 then allocates one or more radio resources such as radio frequencies supporting communication over the frequency band to the first radio access technology of the first cell 13 or the second radio access technology of the second cell 15 based on the determined load. The controller unit 901 may increase the frequency band of the third RAT 1 Base Band unit 903 if the load in the first cell 13 is heavy. Similarly, the controller unit 901 may reduce the frequency band of the fourth RAT 2 Base Band unit 904 if the load in the second cell 15 is below a certain threshold. In some embodiments, the controller unit 901 may also control the common radio unit R3 based on the determined load to increase or reduce the frequency band of the common radio unit R3. Thus, the controller unit 901 may use input on how much traffic each radio access technology carries, e.g. resource utilization, queue length, power use, number of user equipments, etc. Based on this input the controller unit 901 may assign or distribute the total bandwidth between the radio access technologies and control the operation of the third and fourth Base Band units 903,904 and radio unit R3 accordingly.

Figure 10:
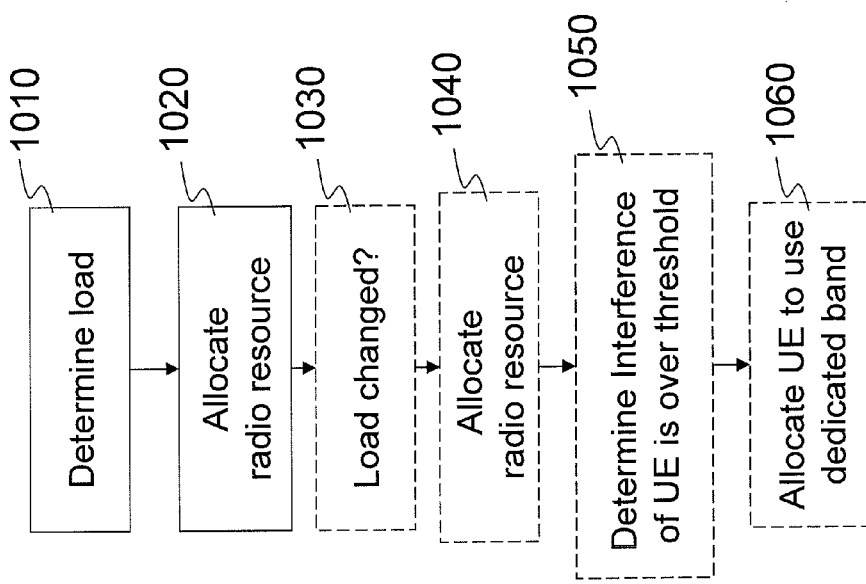
FIG. 10 is a schematic flow chart in a radio communications network.

The method steps in the radio base station 12, 51,121-124, referred to herein as radio base station 12, for allocating a radio resource to be used for communication in a radio communications network according to some general embodiments will now be described with reference to a flowchart depicted in FIG. 10. The steps do not have to be taken in the order stated below, but may be taken in any suitable order. As mentioned above, the radio base station 12 serves the first cell 13 of the first radio access technology and the second cell 15 of the second radio access technology. The first cell 13 and second cell 15 are comprised in the radio communications network. Furthermore, the radio base station 12 controls a radio resource that supports communication over a frequency band. Such radio resource may be a radio frequency or equipment within the radio base station such as a radio unit comprising a receiving circuit, a base band unit or the like. The first cell 13 and second cell 15 may be micro or macro cells.

Step 1010. The radio base station 12 determines a load in at least one of the first cell 13 and second cell 15. The load may be determined based on resource utilization, queue length, power use, number of user equipments active, number of user equipments using a certain radio access technology or the like.

Step 1020. The radio base station 12 allocates the radio resource supporting communication over the frequency band to the first radio access technology of the first cell 13 or the second radio access technology of the second cell 15 based on the determined load. For example, the radio base station 12 may determine to start using the radio resource supporting communication over the frequency band for the first radio access technology when load of the first radio access technology is first detected. As the radio base station 12 detects loads in the cells 13, 15, 17 and reconfigures the radio resources accordingly a reconfigurable radio resource utilization that is automatically performed at the radio base station 12 is provided.

In some embodiments, the radio base station 12 allocates the radio resource supporting communication over the frequency band to both the first radio access technology of the first cell 13 and the second radio access technology of the second cell 15 when the load in the first cell 13 and the second cell 15 are determined to be below a threshold value, also referred to as a load threshold value. Thus, the radio base station 12 allocates the radio resource to the first and/or the second radio access technology. The radio resource may in some embodiments comprise the first radio unit R1 dedicated to the frequency band and the second radio unit R2 dedicated to a different frequency band. The radio base station 12 may then shut down the second radio unit R2 when the load in the first cell 13 and the second cell 15 are determined to be below the threshold value.

Step 1030. In some alternative embodiments, as indicated by the dashed line, the radio base station 12 determines that the load in at least one of the first cell 13 and the second cell 15 changes from the determined load to a changed load.

Step 1040. In some alternative embodiments, as indicated by the dashed line, the radio base station 12 then allocated the radio resource supporting communication over the frequency band to the first radio access technology of the first cell 13 or the second radio access technology of the second cell 15 based on the changed load. For example, the radio base station 12 may reallocate one or more radio resources from the first cell 13 to the second cell 15 if the load has increased in the second cell. When performing this reallocation the radio base station 12 may first close down the traffic in the first cell 13 using the radio resource to be reallocated. The radio base station 12 may then reconfigure a user equipment using the radio resource to a different radio resource. Then the radio base station 12 reconfigures a base band unit and/or a radio unit to support the second radio access technology of the second cell. It should be noted that neighbor cell relations may need to be updated accordingly with Automatic neighbor relation (ANR) algorithms or by some other means such as manually or predefined.

In some embodiments, the radio base station 12 may support at least one dedicated frequency band, which dedicated frequency band is dedicated to one of the first and second radio access technologies.

Step 1050. In some alternative embodiments, as indicated by the dashed line, the radio base station 12 may determine when an interference level of the user equipment 10 towards a neighboring cell 130,150 of a different radio base station 51 exceeds an interference threshold. The user equipment 10 is served in the first cell 13 or the second cell 15. The neighboring cell 130,150 of the different radio base station 51 uses a different dedicated frequency band of a radio access technology, which radio access technology is different than the user equipment 10 uses. Also, the different dedicated frequency band may be separated in frequency to the dedicated frequency band of the radio base station 12.

Step 1060. In some alternative embodiments, as indicated by the dashed line, the radio base station 12 may allocate a radio resource for the user equipment 10 to use of the dedicated frequency band when the interference level exceeds the interference threshold.

In some embodiments, the interference level of the user equipment 10 may be determined to exceed the interference threshold when the user equipment 10 is positioned within a range from a cell edge of the first cell or the second cell. Thus, in some embodiments the radio base station 12 may determine when the user equipment 10 within the first cell 13 or the second cell 15 is positioned within a range from a cell edge of the first cell 13 or the second cell 15. That being the case, the radio base station 12 allocates the user equipment 10 to use a radio resource of the dedicated frequency band.

In some embodiments, the interference level of the user equipment 10 may be determined to exceed the interference threshold when a measured and reported interference from the neighboring radio base station exceeds the interference threshold, or a combination of the both may be implemented to use as an interference threshold.

An Operation Support System (OSS) in the radio communications network may be arranged to allow or not allow functionality according to embodiments herein, taking coverage of the different RATs into consideration.

Embodiments herein enable operators to dynamically allocate or re-allocate resources between two or more radio access technologies, hence the resource utilization is higher and the service provided to the end users is improved.

Figure 11:
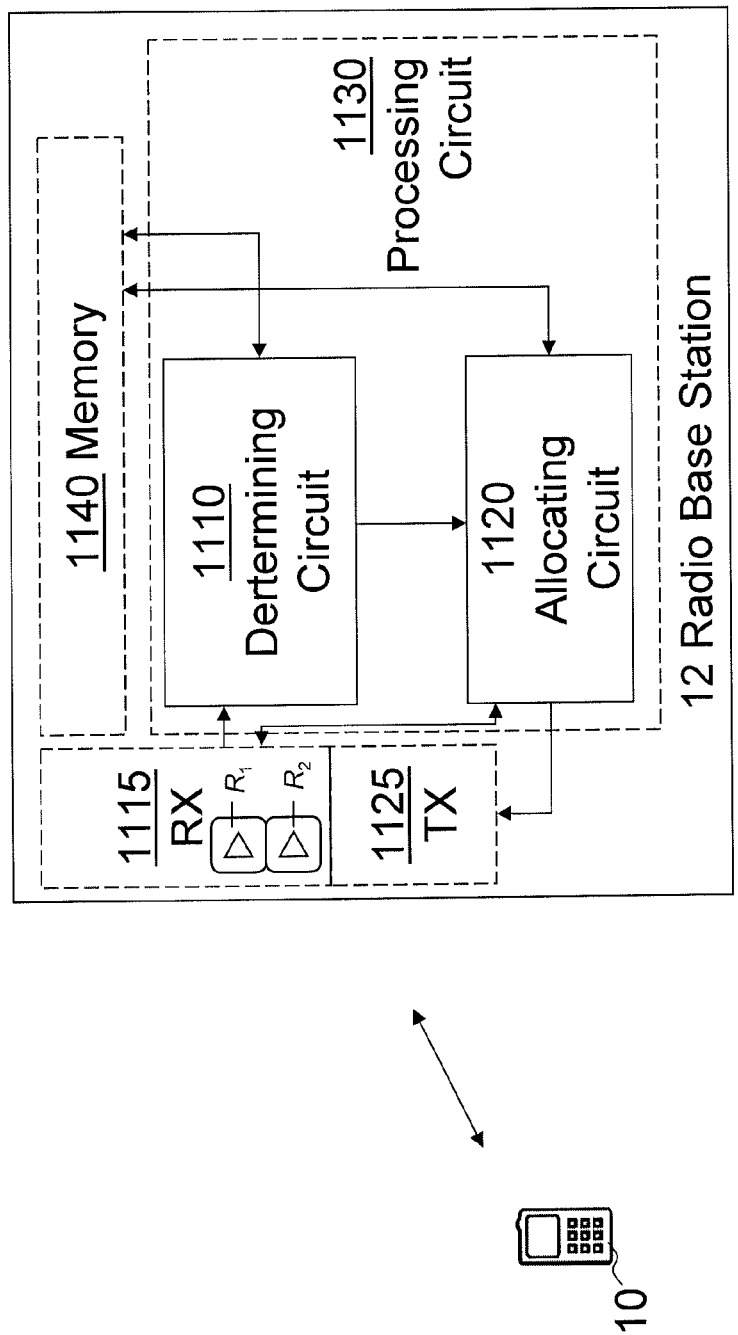
FIG. 11 is a block diagram depicting a radio base station.

In order to perform the method a radio base station 12 is provided. The radio base station 12 for allocating a radio resource to be used for communication in a radio communications network is illustrated in FIG. 11. The radio base station 12 is configured to serve a first cell 13 of a first radio access technology and a second cell 15 of a second radio access technology. The first cell 13 and second cell 15 are comprised in the radio communications network and the radio base station 12 is arranged to control a radio resource that supports communication over a frequency band. The radio base station 12 comprises a determining circuit 1110 configured to determine a load in at least one of the first cell 13 and second cell 15. The load may be indicated within the radio base station 12 or over a receiver RX 1115.

The radio base station 12 further comprises an allocating circuit 1120, configured to allocate the radio resource supporting the frequency band to the first radio access technology of the first cell 13 or the second radio access technology of the second cell 15 based on the determined load. It should here be noted that the determining circuit 1110 and the allocating circuit 1120 may correspond to the controller units 801, 901 in FIG. 8 and FIG. 9. The allocating circuit 1120 may further be configured to allocate the radio resource supporting communication over the frequency band to both the first radio access technology of the first cell 13 and the second radio access technology of the second cell 15 when the load in the first cell 13 and the second cell 15 are determined in the determining circuit 1110 to be below a threshold value, also referred to as a load threshold value. The radio resource may comprise a first radio unit R1 of the receiver RX 1115. The first radio unit R1 may be dedicated to the frequency band and a second radio unit R2 of the receiver RX 1115 may be dedicated to a different frequency band. The allocating circuit is then configured to shut down the second radio unit R2 when the load in the first cell 13 and the second cell 15 are determined to be below the threshold value.

The determining circuit 1110 may be configured to determine that the load in at least one of the first cell 13 and second cell 15 changes from the determined load to a changed load. Then the allocating circuit may be configured to allocate the radio resource supporting communication over the frequency band to the first radio access technology of the first cell 13 or the second radio access technology of the second cell 15 based on the changed load.

It should be noted that the radio base station 12 may further support at least one dedicated frequency band, which dedicated frequency band is dedicated to one of the first and second radio access technologies. A user equipment 10 may be served in the first cell 13 or the second cell 15, and a neighboring cell 130,150 of a different radio base station 51 uses a different dedicated frequency band of a radio access technology. The radio access technology is different than the radio access technology the user equipment 10 uses, and the different dedicated frequency band is separated in frequency to the dedicated frequency band of the radio base station 12. The determining circuit 1110 may then be configured to determine when an interference level of the user equipment 10 towards the neighboring cell 130,150 of the different radio base station 51 exceeds an interference threshold. In that case, the allocation circuit 1120 is configured to allocate the user equipment 10 to use a radio resource of the dedicated frequency band.

The interference level of the user equipment 10 is determined to exceed the interference threshold by the determining circuit 1110 when the user equipment 10 is positioned within a range from a cell edge of the first cell or the second cell and/or when a measured and reported interference from the neighboring radio base station exceeds the interference threshold.

The first cell 13 and second cell 15 may be micro cells with an overlaying macro cell providing radio coverage over the first and second cells of dedicated radio frequency bands and the micro cells dynamically allocate intermediate radio frequency bands to different radio access technologies. The radio resource to be allocated may comprise a base band unit, one radio unit comprising a receiving circuit, a carrier and/or a radio frequency.

In order to communicate with the user equipment 10 the radio base station 12 comprises a transmitter TX 1125, The allocating circuit 1120 may also be configured to allocate the radio resource to the transmitter TX 1125 or modify the transmitter TX 1125 to enable communication over the frequency band.

The present mechanism for allocating a radio resource to be used for communication in a radio communications network may be implemented through one or more processors, such as a processing circuit 1130 in the radio base station 12 depicted in FIG. 11 or as controller units 801, 901 in FIGS. 8 and 9, together with computer program code for performing the functions of the present embodiments. The program code mentioned above may also be provided as a computer program product, for instance in the form of a data carrier carrying computer program code for performing the present solution when being loaded into the radio base station 12. One such carrier may be in the form of a CD ROM disc. It is however feasible with other data carriers such as a memory stick. The computer program code may furthermore be provided as pure program code on a server and downloaded to the base station 12. Furthermore, the radio base station may comprise one or more memory units 1140 arranged to be used to store allocations, thresholds, other data, and applications to be executed to perform embodiments herein or the like.

In the drawings and specification, example embodiments of the invention have been disclosed. However, many variations and modifications could be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method in a radio base station for allocating a radio resource to be used for communication in a radio communications network, which radio base station serves a first cell of a first radio access technology and a second cell of a second radio access technology, which first cell and second cell are comprised in the radio communications network, wherein the method comprises:
   determining a load in at least one of the first cell and the second cell; and
   allocating a radio resource for communication from the radio base station to the first radio access technology of the first cell or the second radio access technology of the second cell based on the determined load,
   wherein the radio resource for communication uses a frequency band that comprises a first frequency band dedicated to the first radio access technology, a second frequency band dedicated to the second radio access technology, and a third frequency band allocated to one of the first radio access technology or the second radio access technology based on the determined load, and
   wherein the first, second and third frequency bands are separated in frequency.

2. A method according to claim 1, further comprising:
   determining that a load in at least one of the first cell and the second cell has changed from the determined load to a changed load, and
   allocating the radio resource supporting communication over the third frequency band to the first radio access technology of the first cell or the second radio access technology of the second cell based on the changed load.

3. A method according to claim 1, further comprising:
   determining occurrence of a decision event when an interference level of a user equipment towards a neighboring cell of a different radio base station exceeds an interference threshold, which user equipment is served in the first cell or the second cell, and which neighboring cell of the different radio base station uses a different dedicated frequency band of a radio access technology, which radio access technology is different than the user equipment uses, and which different dedicated frequency band is separated in frequency to the dedicated frequency band of the radio base station, and
   responsive to occurrence of the decision event, allocating the user equipment to use a radio resource of the dedicated frequency band.

4. A method according to claim 3, wherein the interference level of the user equipment is determined to exceed the interference threshold when the user equipment is positioned within a range from a cell edge of the first cell or the second cell.

5. A method according to claim 3, wherein the interference level of the user equipment is determined to exceed the interference threshold when a measured and reported interference from the neighboring radio base station exceeds the interference threshold.

6. A method according to claim 1, wherein the allocating the radio resource comprises allocating the radio resource supporting communication over the third frequency band to both the first radio access technology of the first cell and the second radio access technology of the second cell when the load in the first cell and the second cell are determined to be below a threshold value.

7. A method according to claim 6, wherein:
   the radio resource comprises a first radio unit dedicated to the third frequency band and a second radio unit dedicated to a different frequency band,
   the allocating the radio resource comprises shutting down the second radio unit when the load in the first cell and the second cell are determined to be below the threshold value.

8. A method according to claim 1, wherein the first cell and second cell are micro cells.

9. A radio base station for allocating a radio resource to be used for communication in a radio communications network, which radio base station is configured to serve a first cell of a first radio access technology and a second cell of a second radio access technology, which first cell and second cell are comprised in the radio communications network, wherein the radio base station comprises:
   a determining circuit configured to determine a load in at least one of the first cell and the second cell, and
   an allocating circuit configured to allocate a radio resource for communication from the radio base station to the first radio access technology of the first cell or the second radio access technology of the second cell based on the determined load,
   wherein the radio resource for communication uses a frequency band that comprises a first frequency band dedicated to the first radio access technology, a second frequency band dedicated to the second radio access technology, and a third frequency band allocated to one of the first radio access technology or the second radio access technology based on the determined load, and
   wherein the first, second and third frequency bands are separated in frequency.

10. A radio base station according to claim 9, wherein the determining circuit is further configured to determine that the load in at least one of the first cell and the second cell changes from the determined load to a changed load, and the allocating circuit is further configured to allocate the radio resource supporting communication over the third frequency band to the first radio access technology of the first cell or the second radio access technology of the second cell based on the changed load.

11. A radio base station according to claim 9, wherein the determining circuit is further configured to:
   determine occurrence of a decision event when an interference level of a user equipment towards a neighboring cell of a different radio base station exceeds an interference threshold, which user equipment is served in the first cell or the second cell, and which neighboring cell of the different radio base station uses a different dedicated frequency band of a radio access technology, which radio access technology is different than the user equipment uses, and which different dedicated frequency band is separated in frequency to the dedicated frequency band of the radio base station; and
   the allocating circuit is configured to respond to occurrence of the decision event by allocating the user equipment to use a radio resource of the dedicated frequency band.

12. A radio base station according to claim 11, wherein the determining circuit is further configured to determine that the interference level of the user equipment exceeds the interference threshold when the user equipment is positioned within a range from a cell edge of the first cell or the second cell.

13. A radio base station according to claim 11, wherein the determining circuit is further configured to determine that the interference level of the user equipment exceeds the interference threshold when a measured and reported interference from the neighboring radio base station exceeds the interference threshold.

14. A radio base station according to claim 9, wherein the allocating circuit is further configured to allocate the radio resource supporting communication over the third frequency band to both the first radio access technology of the first cell and the second radio access technology of the second cell when the load in the first cell and the second cell are determined to be below a threshold value.

15. A radio base station according to claim 14, wherein the radio resource comprises a first radio unit dedicated to the third frequency band and a second radio unit dedicated to a different frequency band, and wherein the allocating circuit is configured to shut down the second radio unit when the load in the first cell and the second cell are determined to be below the threshold value.

16. A radio base station according to claim 9, wherein the first cell and second cell are micro cells.

* * * * *